(12) United States Patent
Berque et al.

(10) Patent No.: US 10,954,652 B2
(45) Date of Patent: Mar. 23, 2021

(54) ASSEMBLY AND METHOD FOR INSTALLING A SUBSEA CABLE

(71) Applicant: Fundación Tecnalia Research & Innovation, Derio-Bizkaia (ES)

(72) Inventors: Joannes Berque, Derio-Bizkaia (ES); Antonio Rico Rubio, Derio-Bizkaia (ES); Jan Sellner, Derio-Bizkaia (ES); Alberto Del Pozo Martin, Derio-Bizkaia (ES); Jose Luis Villate Martínez, Derio-Bizkaia (ES)

(73) Assignee: Fundación Tecnalia Research & Innovation, Derio-Bizkaia (ES)

( * ) Notice: Subject to any disclaimer, the term of this patent is extended or adjusted under 35 U.S.C. 154(b) by 0 days.

(21) Appl. No.: 16/309,691

(22) PCT Filed: Jun. 7, 2017

(86) PCT No.: PCT/EP2017/063885
§ 371 (c)(1),
(2) Date: Dec. 13, 2018

(87) PCT Pub. No.: WO2017/216013
PCT Pub. Date: Dec. 21, 2017

(65) Prior Publication Data
US 2019/0136486 A1    May 9, 2019

(30) Foreign Application Priority Data
Jun. 14, 2016    (EP) .................................... 16382274

(51) Int. Cl.
*E02F 5/10*    (2006.01)
*B63B 35/04*    (2006.01)
(Continued)

(52) U.S. Cl.
CPC .............. *E02F 5/105* (2013.01); *B63B 35/04* (2013.01); *B63G 8/001* (2013.01); *E02F 5/104* (2013.01);
(Continued)

(58) Field of Classification Search
CPC . E02F 5/105; E02F 5/106; E02F 5/104; F16L 1/165; H02G 1/10; F03D 13/10; B63B 35/04
(Continued)

(56) References Cited

U.S. PATENT DOCUMENTS 2,067,717 A * 1/1937 Bloomer ................. E02F 5/104
                                                        405/164
3,338,060 A * 8/1967 Harmstorf ............... B63B 35/04
                                                        405/163
(Continued)

FOREIGN PATENT DOCUMENTS

WO    2012/007790    1/2012
WO    2014/125334    8/2014
(Continued)

*Primary Examiner* — Sean D Andrish
(74) *Attorney, Agent, or Firm* — Carmody Torrance Sandak & Hennessey LLP

(57) ABSTRACT

An assembly for installing a subsea cable, the assembly comprising a submersible apparatus and a submersible cable holder comprising the subsea cable, the subsea cable being connectable to the submersible apparatus through the connector for transmission of electric power and/or data to the submersible apparatus; wherein the assembly is configured to install the subsea cable while the submersible apparatus is electrically powered through said subsea cable. And a method for installing a subsea cable with a submersible apparatus, the method comprising: supplying electric power and/or transmitting data through the subsea cable to the
(Continued)

submersible apparatus; and laying the subsea cable in a sea with the submersible apparatus.

17 Claims, 5 Drawing Sheets

(51) Int. Cl.
    *H02G 1/10*     (2006.01)
    *F03D 80/80*     (2016.01)
    *F03D 13/10*     (2016.01)
    *F03D 9/00*     (2016.01)
    *B63G 8/00*     (2006.01)
    *F16L 1/15*     (2006.01)
    *F16L 1/16*     (2006.01)
    *G01V 1/38*     (2006.01)

(52) U.S. Cl.
    CPC ................ *E02F 5/106* (2013.01); *F03D 9/00* (2013.01); *F03D 13/10* (2016.05); *F03D 80/85* (2016.05); *F16L 1/15* (2013.01); *F16L 1/16* (2013.01); *H02G 1/10* (2013.01); *B63G 2008/005* (2013.01); *F05B 2240/95* (2013.01); *G01V 1/3835* (2013.01); *G01V 1/3852* (2013.01); *Y02E 10/727* (2013.01)

(58) Field of Classification Search
    USPC ........................................................ 405/164
    See application file for complete search history.

(56) References Cited

U.S. PATENT DOCUMENTS

| | | | | |
|---|---|---|---|---|
| 3,434,297 | A | | 3/1969 | Gretter et al. |
| 3,477,236 | A | * | 11/1969 | Burrus .................... E21B 41/10 405/204 |
| 5,722,793 | A | * | 3/1998 | Peterson ................. B63B 35/06 405/164 |
| 6,425,708 | B1 | | 7/2002 | Siegfriedsen |
| 7,518,951 | B2 | * | 4/2009 | Solheim ................. G01S 15/87 367/130 |
| 2013/0115006 | A1 | * | 5/2013 | Oldervoll ................ H02G 1/10 405/160 |
| 2013/0327534 | A1 | | 12/2013 | Christie et al. |
| 2014/0241810 | A1 | * | 8/2014 | Lynch ...................... F16L 1/26 405/170 |
| 2014/0311397 | A1 | * | 10/2014 | Appels .................... B63C 11/00 114/321 |
| 2017/0152738 | A1 | * | 6/2017 | Berzanskis ........... E21B 47/011 |

FOREIGN PATENT DOCUMENTS

| | | |
|---|---|---|
| WO | 2015/034368 | 3/2015 |
| WO | 2016/064280 | 4/2016 |
| WO | WO 20160526 * | 5/2016 |

\* cited by examiner

ASSEMBLY AND METHOD FOR INSTALLING A SUBSEA CABLE

TECHNICAL FIELD

The present invention relates to the field of subsea cable installation. Particularly, the invention relates to an assembly and a method for installing a submarine cable.

STATE OF THE ART

Trenching and/or laying out cables may become daunting tasks when they are carried out underwater. The installation of submarine cables is notably complicated because it requires that divers and/or machines dig a trench, place the cables, and bury them at a depth which may range from few meters up to several hundreds of meters, or even few kilometers (e.g. open sea). At these depths, the pressure is multiple times greater than at surface level, and the visibility conditions may be low or non-existent, thus complicating any operation performed underwater.

Also, even though the cable may be buried in the seafloor, installing submarine cables also requires that some tasks are carried out outside of the water (at surface level, for instance), like the connection of the cable to other cables or connectors. So the ends of the cable must be brought up to the surface so as to make said connection, which may not be simple either.

The installation of a submarine cable may not be limited to the first time the cable is deployed when a new offshore facility is built. Particularly, submarine cables are prone to fail or break due to the severe conditions they are exposed to like, for instance, the aforementioned large pressure, sea currents, erosion, etc. Thus it may be necessary to replace cables frequently. Delaying the replacement of a broken cable may lead to long power outages, loss of communications, and loss of economic revenue.

Efforts have been made in the prior art to develop techniques for the installation of cables in rather inaccessible environments like the sea.

International publication number WO 2012/007790 A1 discloses a system for subsea installation of cables with a trenching vehicle being linked to a surface vessel by means of an umbilical. The trenching vehicle includes a sheave and a container in which the cable is stored. The cable stored is allocated, through the sheave, in the trench dug by a digging device while the vehicle moves. The crew on board of the vessel operate the vehicle through the umbilical; the umbilical cable provides the vehicle with electric power and a telemetry link operable by the crew.

U.S. Pat. No. 3,434,297 A relates town ocean cable burying machine with a system for picking up a cable and putting it in a trench. The machine comprises a boom which may sense the position of the cable on the seafloor, moving means in the form of two tractors, and lights and a camera for monitoring its operation. The machine is coupled to a ship with a cable which provides electric power and telemetry thereby making it operable.

Both prior art references disclose the use of a surface vessel which provides electrical energy (through an umbilical) to the machine or vehicle so that it may carry out the tasks of digging and introducing the cable in a trench.

The need for a surface vessel restricts the installation of submarine cables to those periods in which the vessel is available (a very limited number of vessels may carry out the installation of submarine cables), and when both the weather and the sea state are favorable. When the submarine cables interconnect turbines of an offshore wind farm, or wave energy converters, the strength of the wind and the waves may impede the operation of a vessel. Or even if the vessel may indeed support these conditions, the tasks that need to be carried out entail a high level of risk for the crew, particularly the divers. So the installation and/or replacement of subsea cables may not be possible during long periods of time.

Moreover, the use of vessels and their crew is expensive, and as much as the costs of the wind turbines or wave energy converters decrease progressively thanks to the development of new and cost-effective components, the cost of the whole cable installation does not, mainly due to the trenching and laying of cable, and specifically due to the need of vessels.

Thus, innovation in the field of submarine cable installing is deemed necessary. In this sense, it would be advantageous to reduce the need of divers and surface vessels whose presence is largely dependent on the environmental conditions, that is, the sea state, wind, etc.

DESCRIPTION OF THE INVENTION

The apparatus and method for installing a subsea cable disclosed in the present invention intend to solve the problems and shortcomings of prior art machines or vehicles for installing cables underwater.

A first aspect of the invention relates to an assembly for installing a subsea cable, the assembly comprising:
a submersible apparatus comprising a deck, at least one connector, and moving means; and
a submersible cable holder comprising a subsea cable to be installed, the subsea cable being connectable to the submersible apparatus through the at least one connector for transmission of electric power and/or data to the submersible apparatus, and the submersible cable holder being configured to be loaded on and unloaded from the deck;
wherein the assembly is configured to install the subsea cable while the submersible apparatus is electrically powered through the subsea cable.

The assembly may install submarine cables that, for example, are used for transporting electrical energy and/or data. The cables may, for instance, interconnect wind turbines of a wind farm, connect wind turbines to a substation of a wind farm, connect wave energy converters to a substation, etc., and particularly in (but not limited to) offshore locations, that is, locations in which the cables are to be placed in the sea (e.g. on the seabed or in a trench in the seabed).

In this sense, in the context of the present invention, installing a subsea cable refers to laying a cable on the seabed or in a trench in the seabed. Further, in some embodiments, installing a subsea cable refers to laying said cable and connecting one or each of the both ends of the subsea cable to connectors or plugs of another cables or facilities like, for example, any of those listed above. A subsea cable is considered to be a cable which may transport electric power and/or data and which is suitable for underwater environments, that is, the cable may be placed partially or completely underwater; such cables may differ from cables that generally are used outside of the water in that they may support high pressures and stresses, erosion and other adverse phenomena often occurring in the sea.

In those cases in which the assembly installs a subsea cable for transporting electrical energy or electric power, the submersible apparatus of the assembly may advantageously power itself through the cable during its installation. This means that the submersible apparatus obtains electric power through the cable while it is laying said cable in the sea, particularly on the seabed or in a trench. To this end, the submersible apparatus comprises a connector connectable to said cable so that the apparatus may be powered through the cable. In some embodiments, the apparatus may also be monitored and/or controlled through said subsea cable. Preferably, the connector is a wet mate connector.

Therefore, no additional external supply of power is necessary for energizing the submersible apparatus, such as through a separated umbilical cable connected to a surface vessel which requires a crew and appropriate meteorological conditions for the safe and correct operation of the vessel providing the same. Thus, in preferred embodiments, the first end of the subsea cable is connected to a power source of a facility so that electric power and/or data may be delivered to the submersible apparatus upon connection of a second end of the subsea cable to the connector of the submersible apparatus.

As the total length of the cables used for cabling an array of wind turbines may be in the order of several kilometers, several reels of cables may be placed in the sea, throughout the array, so that the submersible apparatus may install the cable of each of these reels so as to interconnect the wind turbines. To this end, the submersible apparatus comprises a deck configured to support loading of a submersible cable holder which, in turn, may be loaded with a reel of cable. When the submersible cable holder (which comprises the cable) of the assembly is mounted on the deck, the submersible apparatus may install the cable held therein.

The submersible apparatus may have loaded one submersible cable holder on the deck at a time, lay the corresponding subsea cable and, in some embodiments, even connect it to other cables or facilities, and unload the cable holder once the cable has been laid out. Then, the submersible apparatus may repeat the process as many times as necessary for installing all the cables.

The assembly may move in the sea owing to the moving means of the submersible apparatus. The moving means comprise a plurality of tracks which provide sufficient grip and maneuverability to the submersible apparatus so that it may adapt to the surface (e.g. seabed, terrain, etc.) on which the cable will be laid regardless of the irregularities of the surface.

In some embodiments, the submersible apparatus further comprises propulsion means for moving when the apparatus (and the assembly) floats in the water column, and also at the sea surface. Thus both the apparatus and the assembly may move in a controlled manner even when they are not in contact with a surface.

The submersible apparatus also comprises buoyancy means which may counteract the weight of the cable holder and the cable retained therein. In preferred embodiments, the buoyancy of said means is adjustable which permits varying the vertical position of the apparatus and assembly and change the weight of the apparatus and assembly on the seabed.

The buoyancy means may be operated with instructions transmitted by operators which may correspond to increasing or decreasing the buoyancy (i.e. floatability) so as to vary the depth of the submersible apparatus and, in this way, be moved vertically until touchdown with the seafloor, or until it surfaces. Further, by adjusting the floatability of the buoyancy means, the position and/or the orientation of the apparatus may be adjusted and/or stabilized.

In preferred embodiments of the invention, the submersible apparatus is further configured to transmit and receive data through the subsea cable.

Operators may include operating instructions in the data to be transmitted through the cable so as to remotely control the submersible apparatus. The apparatus comprises a processing unit that, upon reception of operating instructions, may actuate on the corresponding components so that they carry out the operating instructions.

Therefore, in these embodiments, when the cable is connected to the connector, it may both supply electric power and communicate data to and from the submersible apparatus. In this sense, the apparatus may transmit information regarding its operation so that it may be monitored, for instance it may report the status of its components, sensor data gathered by sensors of the apparatus, etc.

A cable for electrical energy transportation usually also includes optical fibers for data transmission, thus the same cable may also be used for transmitting and receiving data.

In some embodiments, the submersible apparatus further comprises means for digging a trench. In these embodiments, the submersible apparatus is configured to dig a trench in the seabed and to lay the cable in the trench.

In preferred embodiments of the invention, the submersible apparatus further comprises at least one battery. In these embodiments, the submersible apparatus is further configured to obtain electric power from the at least one battery.

Energetic autonomy of the submersible apparatus is made possible with the addition of one or more batteries so that the apparatus may selectively obtain electric power through the cable it is installing or from the battery or batteries. Generally, the submersible apparatus obtains power through the cable during its installation, and switches to the at least one battery when it is not installing any cable, for example when it is returning to the substation so as to be collected, or when it is ready to load another cable holder. The submersible apparatus may switch to the at least one battery for receiving electric power when the assembly must connect the cable to be installed to another cable or facility.

Even though the capacity of the at least one battery may be limited for the tasks the assembly shall carry out, the most power-demanding actions are performed when power is obtained through the cable it lays on the seabed. Further, while the submersible apparatus is being powered through the cable, the electric power may also recharge the at least one battery so that it may last long enough to allow the submersible apparatus to unload a submersible cable holder, move towards another submersible cable holder, load it, and hence lay several cables. The at least one battery may be included within a watertight compartment of the apparatus so that water does not damage it.

After and before the cable-laying, the crew of a vessel may tow the assembly or the submersible apparatus and, in addition, lower it, elevate it, and/or load/offload a cable holder on/from the apparatus so that it may install the submarine cable while it is powered through the cable.

In preferred embodiments, the submersible apparatus further comprises means for wireless data transmission and reception; the submersible apparatus is further configured to transmit and receive data through said means. In some of these preferred embodiments, the means for wireless data transmission comprise a floating antenna and/or a subsea hydrophone.

The antenna is secured to a buoy so that, when the submersible apparatus is underwater, the antenna remains outside of the water owing to the floating capabilities of the buoy. The antenna, then, may capture electromagnetic waves so as to receive data, and/or radiate electromagnetic waves above water so as to transmit data. An elongated conductive element (e.g. wire, cable, etc.) connects the antenna to the apparatus. That is, said conductive element has a first end connected to the antenna (generally through circuitry such as a matching network) and a second end connected to the apparatus.

The submersible apparatus may comprise a system for subsea wireless data transmission and reception such as a hydrophone (in addition to or instead of the antenna) configured to detect acoustic pressure waves that are transmitted through the water. The processing unit of the submersible apparatus may demodulate the information in the acoustic waves in order to retrieve data such as operating instructions. Further, the apparatus may also emit acoustic signals through the hydrophone or another acoustic source, to transmit data related to its operation and/or surroundings. The system for subsea wireless data transmission and reception may be used by the submersible apparatus for communicating with other submersible apparatus.

The submersible apparatus of the assembly further comprises means for manipulating at least one of: the cable to be installed, other cables, a cable connector, cable accessories (such as bend restrictors or stiffeners) or subsea obstacles (such as rocks or plants). The same means may also be used to remove obstacles in the path of the assembly. Said means comprise an arm with a first end secured to the submersible apparatus, and a second end which is provided with a ring, grab, jaws, pliers, or another tool that allows cable manipulation; the tool in said second end may also allow the manipulation of obstacles such as rocks on the seabed which may interfere with the movements of the assembly during the cable installation. The means are configured to hold, unroll and place the cable held in a submersible cable holder such that it may be laid on the seabed or, in those embodiments in which the submersible apparatus includes means for digging a trench, put it in the trench dug.

The means for manipulating the cable may also comprise components to control the tension in the cable being installed.

Further, in some embodiments, the means for manipulating the cable may be configured to connect one end of the cable to a connector, for instance the connector of the submersible apparatus (i.e. while the apparatus is powered by the at least one battery). In these cases, said end of the cable is provided with a plug that fits into the connector.

In some cases, the means for manipulating the cable may also make the connection between the cable and a power or messenger wire of a wind turbine or substation, for example. Once the cables are connected, and with the aid of the messenger wire, operators on the work platform of the wind turbine, for example, may introduce the cable to be installed (e.g. inter-array cable) in a tube (e.g. J-tube, I-tube, etc.) of the wind turbine and, thus, reach the part of the wind turbine that is located at a height above the surface of the water.

In some cases, the means for manipulating the cable may also be outfitted with specific tools for installing accessories on the cable, such as bend restrictors, bend stiffeners, etc. Moreover, the means for manipulating the cable may additionally be configured to also make the connection between any cable and any of the at least one connector or plug of the submersible apparatus. A cable may be connected to one of the apparatus connector or plug, for example, to transmit data or power to other devices while the submersible apparatus receives power and data through another cable. The means for manipulating the cable may operate autonomously, that is, the means manipulate the cable to be installed based on information received from sensors provided in the submersible apparatus. The means may also be actuated with operating instructions transmitted by the operators; the processing unit may thus adjust the operation of the means for manipulating the cable upon reception of instructions through the cable, or system for wireless data transmission and reception (e.g. antenna, hydrophone, etc.).

In some embodiments, the submersible apparatus does not comprise buoyancy means. In these cases, the assembly relies on the buoyancy means included within the buoyancy tank of the submersible cable holder (when said holder is loaded on the submersible apparatus) in order to regulate the depth and weight in water. Further, when the submersible cable holder is loaded on the deck of the submersible apparatus, the buoyancy means of the buoyancy tank may be adjusted so as to counteract part of the weight of the cable holder and, thereby, alleviate the total weight that the apparatus must bear.

The buoyancy of buoyancy means may be adjusted by actuating on their pumps. To this end, the operating instructions which in some embodiments may be transmitted to the submersible apparatus through the cable it installs, or through its system for wireless data transmission and reception, may include adjusting the buoyancy of the buoyancy means. The submersible cable holder further includes at least one battery for operating the pumps, a processing unit such as a microcontroller or a processor that instructs the pumps to increase or decrease the buoyancy upon reception of operating instructions through the system for wireless data transmission and reception, and in some cases, a system for wireless data transmission and reception (e.g. a floating antenna over the sea level, subsea hydrophone or any other subsea wireless data transmission system). Further, the cable holder may comprise means for connecting the at least one battery to a power source in order to recharge it; in some embodiments, the submersible apparatus comprises a plug for providing electric power for instance to the cable holder. In addition, said means for connecting to a power source may also include data transmission capabilities, which may complement or replace the system for wireless data transmission and reception.

The buoyancy means may adjust the level of submersion of the submersible cable holder such that the entire holder may be lowered until touchdown with the seafloor, or elevated until it surfaces. When the cable holder is mounted on a submersible apparatus, the buoyancy means of the cable holder may also lower and/or elevate the assembly.

The submersible cable holder, which may be loaded on the submersible apparatus, comprises the cable to be installed. Said cable may be rolled on the drum in such a way that it reduces (or preferably cancels) the torsion turns, coils and/or twists which may occur during the unrolling and laying out of the cable.

When a cable holder is close to a facility such as a wind turbine or a substation, it may be lowered from the sea surface until touchdown with the seafloor or elevated from the seafloor until it surfaces by means of a lifting mechanism such as a hoist, a winch, or the like; the lifting mechanism may be located on the facility (on the part outside of the water) and be operated by a person.

Preferably, prior to lowering the submersible cable holder until it reaches the seafloor, the first end of the cable is connected to the power source of the facility so that electric power may be delivered to the submersible apparatus upon connection of the second end to the connector of the apparatus.

In some embodiments, the submersible apparatus further comprises an acoustic positioning system for sensing subsea acoustic beacons. The submersible apparatus may sense subsea acoustic beacons prepositioned in the sea, for instance throughout the array, so that it may estimate its position more precisely (e.g. using several beacons the acoustic positioning system may compute an area where the apparatus may be located and, therefore, set or adjust the waypoints) and actuate on its moving means (e.g. plurality of tracks, propulsion means) in order to install the subsea cable.

In some embodiments, the submersible apparatus may comprise more than one connector, preferably wet mate connectors, to permit data and power transmission with more than one cable.

Further, in preferred embodiments, the submersible apparatus may comprise instruments to measure or monitor its surroundings and its operating conditions. Some non-limiting examples of instruments are video cameras, passive and active acoustic systems, pressure sensors, temperature sensors, or electric or magnetic field sensors.

A second aspect of the invention relates to a method for installing a subsea cable with a submersible apparatus, the method comprising:

supplying electric power and/or transmitting data through the subsea cable to the submersible apparatus; and laying the subsea cable in a sea with the submersible apparatus.

With this method, installing a subsea cable, that is, laying a cable in a sea (e.g. on the seabed or in a trench in the seabed), may be carried out with a submersible apparatus while it is, at the same time, electrically powered and/or operated through the same cable. In this sense, by connecting the cable to the connector of the submersible apparatus, the apparatus may be energized and/or controlled by operators through said cable during the installation of the same.

In preferred embodiments of the invention, the first end of the subsea cable is connected to a power source of a facility (e.g. a generator or an auxiliary grid of a substation, a wind turbine, etc.). In some of these embodiments, the method comprises connecting said first end of the subsea cable to the power source of the facility.

In this regard, it may be advantageous that, on the location where the cable installation shall take place, a fixed platform or facility which comprises a power source (e.g. an offshore substation) has I-tubes and/or J-tubes through which messenger wires run, said messenger wires having one end that floats up to the surface. As is common practice in the art of installing cables at sea, such messenger wires, which are lighter and much easier to handle than power cables, can be used to guide and pull the power cables, for example into a I-tube or J-tube.

The crew on a tow boat or operators may grab the floating ends of said messenger wires and connect them to the first end of the cable to be installed.

The messenger wires can then be used to pull up the first end of the cable to be installed in the sea on the deck of the fixed platform or facility where connecting said first end of the cable to the power source of the facility may take place. A number of submersible cable holders carrying other cables to be laid in the sea can have respective first ends connected to the power source in such a way.

Since the first end is now connected to a facility, upon connection of the second end of the cable to the connector of a submersible apparatus, electric power and/or data may be transferred through said cable that will then be installed by the assembly.

In some embodiments, laying the subsea cable in the sea with the submersible apparatus comprises laying the cable on a seabed.

In some other embodiments, the method further comprises digging a trench in a seabed with the submersible apparatus, and the step of laying the subsea cable in the sea with the submersible apparatus comprises laying the cable in the trench in the seabed. To this end, the submersible apparatus comprises means for digging a trench.

Further, the submersible apparatus may include means for manipulating the cable which may lay said cable on the seabed or introduce it in the trench. The apparatus may also comprise funneling means and means for controlling tension in the cable so as to carry out the cable installation.

In some embodiments, the method further comprises supplying electric power from at least one battery to the submersible apparatus, wherein the submersible apparatus comprises the at least one battery.

When electric power is obtained from the at least one battery, the method may further comprise connecting the cable to a facility, for instance, to a connector of a facility for completing a connection of the cable between two points (e.g. a first wind turbine and a second wind turbine, a substation and a wind turbine, a substation and a wave energy converter, etc.).

After laying a cable in the sea and, possibly, making the connection between two endpoints such as power generating devices, the apparatus may use the at least one battery to make its way back to the nearest offshore substation; there, the submersible cable holder may be unloaded from the submersible apparatus so that another submersible cable holder is loaded on the deck of the apparatus thereby forming an assembly, the cable holders preferably comprising a cable with a first end connected to a power or data transmission source. The assembly may make use of a system for subsea wireless data transmission or a floating antenna comprised in the apparatus for its control and monitoring.

In some embodiments of the invention, the method further comprises loading a submersible cable holder on the submersible apparatus, the submersible cable holder comprising the subsea cable preferably in a rolled form.

When the submersible cable holder is loaded on the submersible apparatus at port, the assembly may be towed from harbor to the location where the cable is to be laid out. A tow boat may also tow one or more assemblies and/or submersible cable holders carrying further cables to be laid out and/or installed.

In some embodiments, the method further comprises lowering onto the seafloor a submersible apparatus, a submersible cable holder with a cable loaded thereon, and/or an assembly, with a lifting mechanism such as a hoist, a winch, or the like, wherein the lifting mechanism is located at a vessel, a platform, or a facility such as a substation or a wind turbine of an offshore wind farm.

In some embodiments of the invention, the method further comprises transmitting data to and/or receiving data from the submersible apparatus through the subsea cable. In some of these embodiments, transmitting data to the submersible apparatus comprises providing operating instructions through the subsea cable to the submersible apparatus.

In some embodiments, the method further comprises introducing part of the subsea cable in a carrying means, the carrying means being configured to be hoisted from a facility.

The carrying means are secured to an elongated flexible element (e.g. tendon, rope, chain, cable, etc.) connected to a lifting mechanism (e.g. a hoist, a winch, etc.) of a facility (e.g. wind turbine, substation, etc.).

In some of these embodiments, the carrying means comprises a hollow device which may be, for example, semicircular. The hollow device is lowered with the lifting mechanism until it touches the seafloor, where it remains until part of the cable is introduced in the device. Preferably, the lifting mechanism is located on the part of the facility outside of the water (e.g. intermediate platform, work platform, etc.) so that it may be operated manually by a person, although it may also be controlled remotely. Then, the hollow device together with the part of the cable are hoisted with the lifting mechanism until they arrive to a part of the facility where an operator may extract the part of the cable from the hollow device, thereby allowing the manipulation of the cable in order to complete its installation.

In some other embodiments, the carrying means comprises at least one unassembled tube or elongated element, and preferably two unassembled tubes or elongated elements. The unassembled tube/s or elongated element/s may be I-shaped, J-shaped or have varying curvatures and several inflexion points to permit easy laying in of a cable and protection of said cable from excessive bending or torsion.

Each tube or elongated element can be split or open in two parts, preferably length-wise. One of said parts may be laid horizontally on the seafloor, while the other part remains vertical and firmly attached to, for example, the foundation of a fixed offshore wind turbine. Further, one or both parts may be shaped to permit the easy laying-in of a cable. For example, it may have sufficiently wide opening along its long-axis. It may also have a cross section shaped such that when the part of the elongated element is horizontal on the seafloor, and a cable is laid onto it, the force of gravity will guide the cable down towards its adequate position in said part.

Further, the two parts of each tube or elongated element may be connected by a hinge. One or more tethers may be attached to the part that will be laid horizontal on the seafloor, to permit its safe lowering and hoisting up by a pulley or winch.

Part of the cable is introduced in the at least one unassembled tube, and when the carrying means comprises two unassembled tubes, the cable is introduced in the two unassembled tubes such that the cable forms a U shape between the tubes. Operators in the facility then hoist the at least one or the two unassembled tubes and attach it/them to a framework provided in the foundation of the facility and, therefore, block the open part of the cross-section. Thus, as the geometry of the tube/s matches the geometry of the framework, when the unassembled tube/s is/are attached to the framework, the cable is held therein and goes from the seafloor to the platform of the facility, and then back to the seafloor (if the carrying means comprises two unassembled tubes).

In some embodiments of the invention, the method further comprises surfacing a first or second end of the cable, and connecting the first or second end of the cable to an end of another tether (i.e. messenger wires).

When the cable to be installed corresponds to an export cable, that is, a cable which connects an offshore substation to the electrical grid on land, for instance, it may feature a length in the order of tens or even hundreds of kilometers. Thus, it may be advantageous to divide the cable into segments, which later may be connected or spliced together, in order to keep the weight of each cable segment within limits that facilitate the laying out and installation of the export cable.

Therefore, after laying a cable (of a first submersible cable holder) on the seabed or in a trench, one possibility is buoying up the part of the cable which comprises a first or second end thereby bringing said part to the surface. Then, the connection of the cable to a second cable can be carried out on the surface, for example on a platform, in a deck of a boat, or the like. Connecting the cables may be done using plugs and connectors provided in the cables, or splicing the cables together, for example. A second submersible cable holder comprising the second cable rolled on its drum may be positioned close to the platform, boat, or the like, such that after connecting the cables, a submersible apparatus may offload the first cable holder, load the second cable holder, and continue installing the export cable.

Alternatively, joining consecutive segments of the export cable is performed using subsea connectors, in which case the operation of connecting two segments of the export cable is carried out underwater.

Further, similar advantages as those described for the first aspect of the invention may also be applicable to this aspect of the invention. Also, the submersible apparatus, submersible cable holder, and the assembly described in this aspect of the invention are preferably, but not limited to, those described in the first aspect of the invention.

Another aspect of the invention relates to a system for installing a subsea cable, the system comprising:
a carrying means configured to receive the subsea cable while the carrying means is contacting a seafloor; and
a facility configured to hoist the carrying means.

In some embodiments, the carrying means comprises at least one unassembled tube configured to be open in a first part and a second part; the first part is configured to receive the subsea cable while the first part is contacting the seafloor; and the facility is configured to hoist the first part.

In some of these embodiments, the second part is configured to attach to the facility, and to receive the first part upon hoisting the first part thereby joining together the first part and the second part.

In some embodiments, the carrying means comprises two unassembled tubes configured to receive the subsea cable while the first part is contacting the seafloor such that the subsea cable forms a U shape between the two unassembled tubes.

In some of these embodiments, each unassembled tube of the carrying means comprises an open cross-section.

In some of these embodiments, each unassembled tube of the carrying means comprises a side open lengthwise.

In some embodiments, the carrying means comprises a hollow device with a semi-circular shape and configured to receive the subsea cable while the first part is contacting the seafloor.

In some embodiments, the facility comprises a lifting mechanism and an elongated flexible element connected to the lifting mechanism; and the carrying means is configured to be secured to the elongated flexible element.

Similar advantages as those described for the second aspect of the invention may also be applicable to this aspect of the invention.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF A WAY OF CARRYING OUT THE INVENTION

Figure 1:
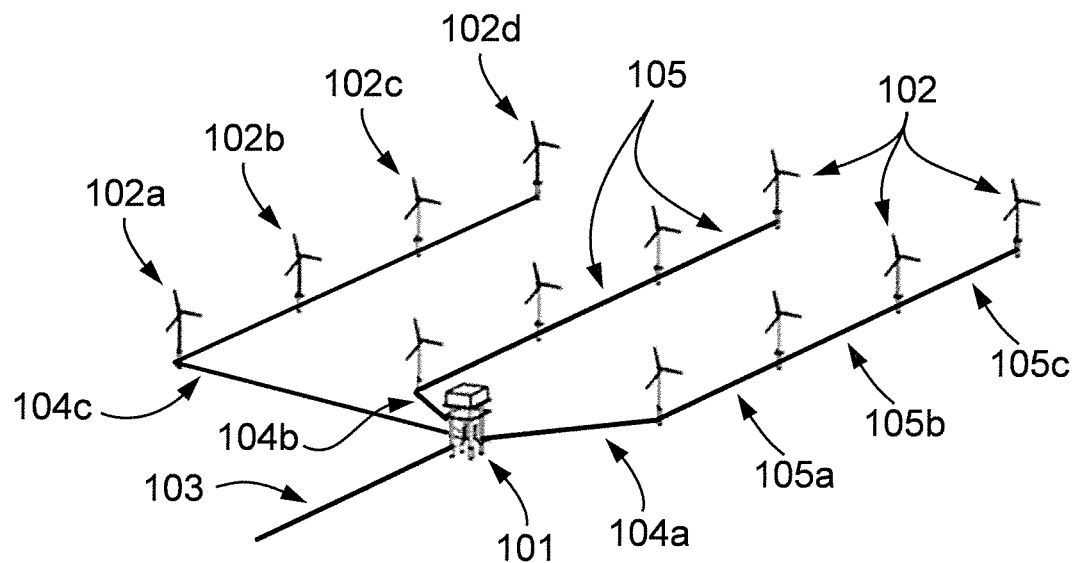
FIG. 1 is a representation of an offshore wind farm.

FIG. 1 shows, in a perspective view, an offshore wind farm located in the sea. A substation 101 collects the electric power of each wind turbine 102 through the cables 104a-104c (connecting the substation 101 to the first wind turbine of each branch) and 105 (connecting two consecutive wind turbines 102 of a same branch) and transfers the combined electric power to a facility on land, for example, through the export cable 103; that is, the cable/s 103 may interconnect the substation 101 to the electrical grid that may be on land. The cables 103, 104a-104c and 105 may be laid on the seafloor or be introduced in trenches.

Figure 2:
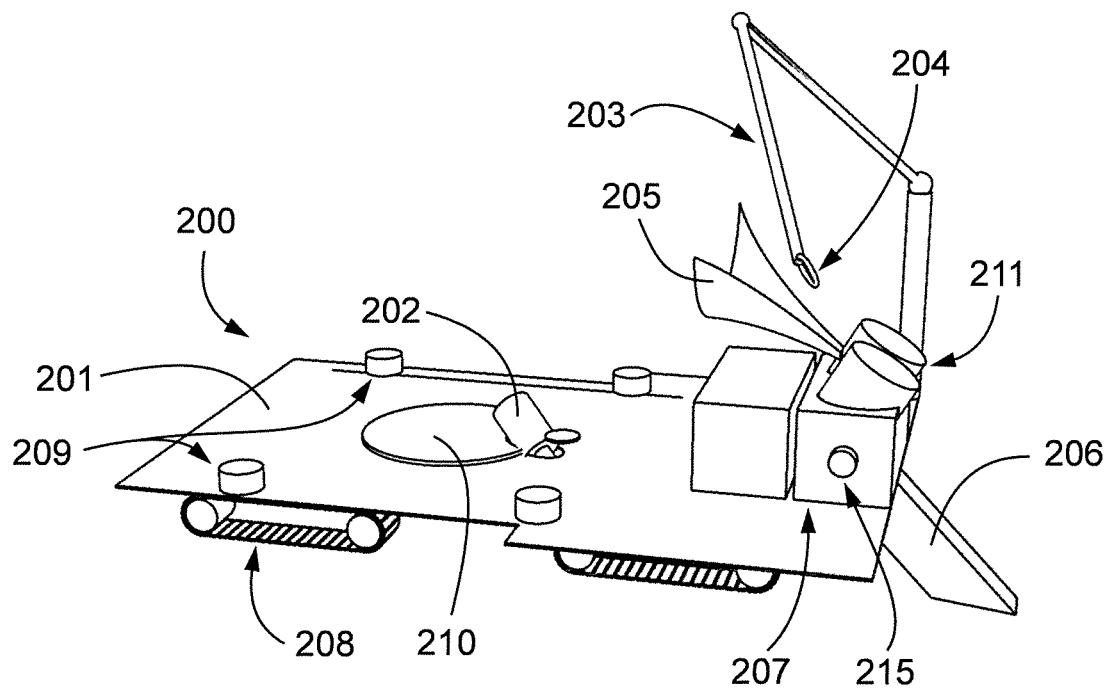
FIG. 2 is a submersible apparatus of an assembly for installing a subsea cable in accordance with an embodiment of the invention.

FIG. 2 shows the submersible apparatus 200 for laying a cable in a trench in accordance with an embodiment of the invention. The submersible apparatus 200 comprises a deck 201, a connector 202, means 203 for manipulating a cable, cable accessories, or subsea obstacles (e.g. rocks or plants), funneling means 205, means 206 for digging a trench (e.g. one or more of pre-lay trenching tools such as dredgers and V-shape ploughs, water jetting tools such as one or more jetting blades, jet sledge, hydro plough, vertical injector or mass flow excavation tools, ploughing tools such as cable ploughs and vibration ploughs, mechanical cutting tools such as chain cutters or rock wheel cutters, venture systems, or other tools commonly used in the art of installing subsea cable), watertight compartments 207, moving means 208, a plurality of hydraulic cylinders 209, a support 210 for the drum of a submersible cable holder, means 211 for controlling tension in the cable to be installed, and a system for wireless data transmission and reception.

The submersible apparatus 200 may advantageously be powered through the cable 304, which is installed by an assembly (such as the one of FIG. 4) that comprises the submersible apparatus 200 and a submersible cable holder 300, when the cable is connected to the connector 202.

Figure 3:
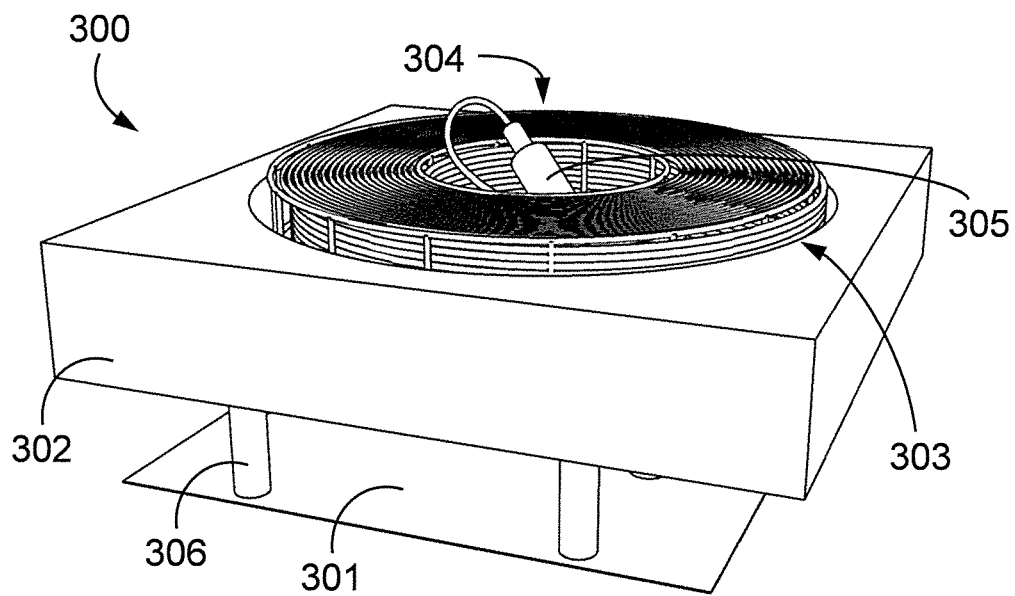
FIG. 3 is a submersible cable holder of an assembly for installing a subsea cable in accordance with an embodiment of the invention.

The cable which is to be laid out and connected to the connector 202 is held in a submersible cable holder 300, such as the one depicted in FIG. 3, loadable on the apparatus 200, that is, which may be loaded on the apparatus. In particular, the deck 201 of the submersible apparatus 200 is configured to support loading of the submersible cable holder 300. The plurality of hydraulic cylinders 209 may lift a submersible cable holder 300 that is lying, for example, on the seafloor, and load it on the deck 201.

The means 203 for manipulating the cable comprise an arm which, in some embodiments, is extensible. Said arm comprises a first end securely fastened to the structure of the apparatus 200, and a second end including a tool for cable manipulation such as the ring-shaped tool 204.

The moving means 208 include a plurality of tracks that provide sufficient grip on irregular surfaces, such as the seabed, so as to permit the movement of the apparatus and, thus, the assembly comprising the submersible apparatus 200.

It should be noted that although not shown on FIG. 2, in some embodiments of the invention the submersible apparatus 200 may include further moving means such as propulsion means for moving underwater or on the water surface.

The submersible apparatus 200 may also be provided with buoyancy means (not shown) known in the art which permit adjusting its floatability, and thus increase/decrease the depth of the apparatus so as to arrive to the seabed or the surface. The buoyancy means may be included within the watertight compartment 207 which, moreover, may store at least one battery, for example. The submersible apparatus 200 also comprises means for changing the buoyancy of the buoyancy means, for instance upon reception of instructions through the cable to be installed or the system for wireless data transmission and reception.

FIG. 3 is a submersible cable holder 300 in accordance with an embodiment of the invention. The submersible cable holder 300 may provide the cable 304 to be installed to a submersible apparatus 200 like the one shown in FIG. 2. The cable holder 300 comprises a support platform 301, a buoyancy tank 302 including buoyancy means, a drum 303 comprising the cable 304 in a rolled form, a plurality of legs 306, and a system for wireless data transmission and reception. The support platform 301 prevents the whole cable holder 300 from sinking below the seafloor when said seafloor is soft, and it further eases the loading of the cable holder 300 on the submersible apparatus 200. The support platform 301 may be detached from the buoyancy tank 302 when it is loaded on the deck 201 of the submersible apparatus 200.

Prior to loading the cable holder 300 on the submersible apparatus 200, the cable 304 is rolled on the drum 303, and preferably a first end (not shown) of the cable 304 is connected to a power source which may be, for example, a substation 101 of an offshore wind farm. The cable 304 may be rolled on the drum 303 after connection of the cable to the power source, or before making said connection.

A second end of the cable 304 may be provided with the plug 305 that fits into the connector 202, thus making possible the connection between the cable 304 and the submersible apparatus 200, and hence supply electric power (transmitted from the power source) and/or transmit data to the submersible apparatus through said cable 304.

The submersible cable holder 200 also comprises means for changing the buoyancy of the buoyancy tank 302, for instance upon reception of instructions from the submersible apparatus 200 when they form an assembly, or through the system for wireless data transmission and reception.

Figure 4:
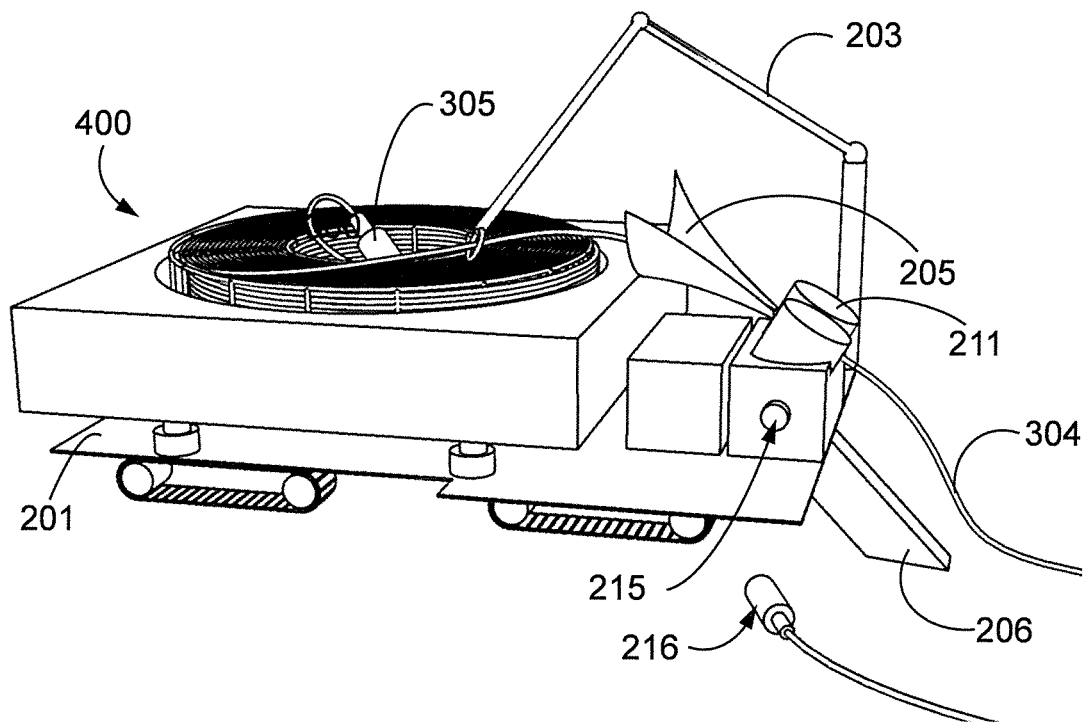
FIG. 4 is an assembly for installing a subsea cable in accordance with an embodiment of the invention.

FIG. 4 is an assembly 400 for installing a cable on a seabed or in a trench in accordance with an embodiment of the invention. The assembly 400 may also make the connection between the submarine cable laid out and endpoints such as power sources of facilities or fixed platforms thereby interconnecting both facilities or platforms.

The assembly 400 comprises a submersible apparatus 200 and a submersible cable holder 300 mounted on the deck 201 of the submersible apparatus 200; the cable holder 300 is detached from its support platform 301 while the cable holder 300 is being loaded on the apparatus 200. When the submersible apparatus 200 is not provided with means 206 for digging a trench or said means are not used, the assembly 400 may lay the cable directly on the seabed without carrying out any trenching.

The means 203 for manipulating the cable unroll the cable 304 held in the drum of the cable holder 300 and orient it towards the funneling means 205; the funneling means 205, in turn, orient the cable towards the means 211 for controlling tension, after which the cable 304 is introduced in the trench or laid on the seabed if no trench is dug (e.g. when the submersible apparatus of the assembly does not include means for digging a trench).

While the plug 305 of the cable 304 is plugged in the connector 202 (not illustrated in FIG. 4), the cable 304 may supply electric power to the assembly 400 as long as the other end of the cable 304 is connected to a power source. Similarly, the cable 304 may transmit data to and/or receive data from the submersible apparatus 200 through the cable since, in many cases, the same cable includes optical fibers for data transmission and reception.

Further, the submersible apparatus 200 of the assembly 400 may have an additional connector 215 which may be in the form of a socket or a plug. The connector 215 may receive a wet-mate connector 216, for example, so as to transmit and/or receive power and/or data to/from another apparatus.

The assembly 400 can install subsea cables 104a-104c starting from the position of the substation 101 and ending at the position of the wind turbine of a branch that is farthest from the substation 101. For example, for installing cable 104c, the submersible apparatus 200 loads a cable holder 300 near the substation 101. The cable 304 held in the drum 303 of the cable holder 300, which has a first end connected to a power source of the substation 101 (e.g. an auxiliary electrical grid), has the second end connected to the connector 202 of the submarine apparatus 200 so that it delivers electric power to it. Thus, the apparatus 200 lays out the cable 304 from the substation 101 to the wind turbine 102a (as seen in FIG. 1) while being energized through the same cable 304.

Further, the assembly 400 can install cables 105 (inter-array cables) starting from the last wind turbine of a branch that is already connected (directly or indirectly) to the substation 101. For instance, with reference to FIG. 1, when the branch of cable 104a is to be installed, the assembly 400 first installs cable 104a in order to interconnect the substation 101 with the first wind turbine; the assembly 400 then installs the cable 105a, then the cable 105b, and lastly the cable 105c. In this sequence, the assembly 400 may be powered with the cable it installs while it lays out the cables 104a, 105a-105c.

In another example, when the wind turbine 102a is already connected to the substation 101, the assembly 400 installs the cable 304 between the wind turbines 102a-102b, then the cable between the turbines 102b-102c, and finally the cable between the wind turbines 102c-102d; this sequence also permits the assembly 400 to be energized, during most of the time, through the cables it installs.

In both cases, the assembly 400 may receive the power supplied by the substation 101 or a wind turbine 102 (which has electric power) in order to perform most of the installing tasks. The assembly 400 may keep the usage of the at least one battery to a minimum since it may rely on the energy stored therein when no cable is being installed (e.g. while returning to a substation 101, while unmounting a cable holder 300 and/or mounting another cable holder 300, etc.), and further the at least one battery may be recharged while electric power is being supplied to the assembly 400 through the cable 304.

Figure 5:
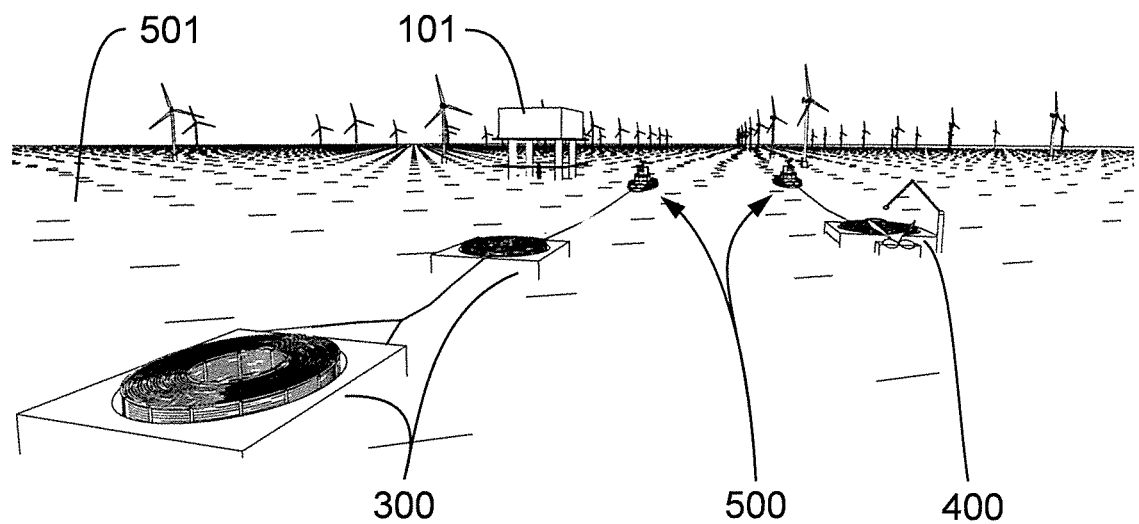
FIG. 5 is a representation of several vessels towing cable holders and an assembly.

FIG. 5 is a schematic representation of vessels 500 towing an assembly 400 and submersible cable holders 300.

The vessels 500 tow (with towing means known in the art) from harbor to, for example, a substation 101 of an offshore wind farm one or more assemblies 400, cable holders 300 and/or submersible apparatuses 200. Preferably, the towed devices comprise buoyancy means. Each of the cable holders 300 may comprise a cable held in its drum prior to being towed so as to ease the installation of the subsea cables.

In some cases, any of the assemblies 400, submersible cable holders 300 and/or submersible apparatuses 200, may tow other assemblies, submersible cable holders and/or submersible apparatuses.

Figure 6A:
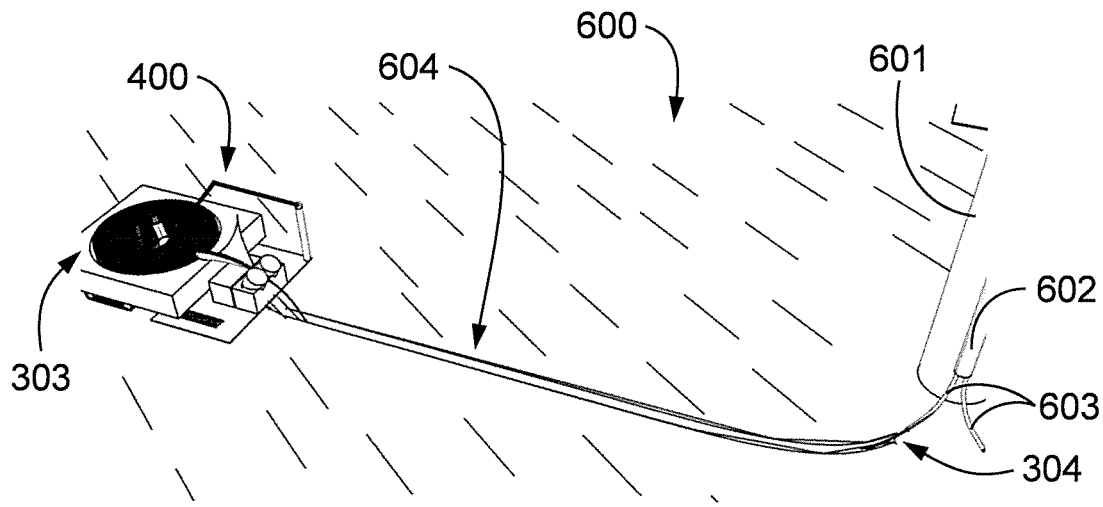
FIGS. 6A-6D are representations of the installation of a submarine cable in accordance with embodiments of the invention.

FIG. 6A shows the installation of a submarine cable 304. The submersible apparatus of the assembly 400 loads a submersible cable holder near the facility 601 (e.g. substation, wind turbine, etc.) which is partially underwater (i.e. one part below the surface of the sea, and one part above the surface of the sea). The cable holder already comprises a cable 304 which includes a first end connected to a power source of the facility 601. In this sense, the first end of the cable is made go through a J-tube 603 (in an I-tube 602) with the aid of a messenger wire (not illustrated). Thus, by the time the cable holder 300 is to be loaded on the submersible apparatus, part of the cable 304 is already unrolled and introduced in the J-tube 603 so that it may be connected to the power source of the facility 601; the remaining part of the cable 304 is held in the drum of the cable holder 300 and may lay on the seafloor 600 until the apparatus loads it on its deck. The assembly 400 may then install the cable 304.

Therefore, the facility 601 energizes the assembly 400 through the cable 304. The assembly 400 digs a trench 604 in the seafloor and introduces the cable 304 in it while the assembly moves in a forward motion. The means for manipulating the cable unrolls the cable 304 from the drum 303 and orients it towards the funneling means 205 so that it is introduced through the tension controller 211 and in the trench 604. The same cable 304 installed may be used to transmit operating instructions to and data from the assembly 400 so as to perform any of or all these tasks.

Figure 6B:
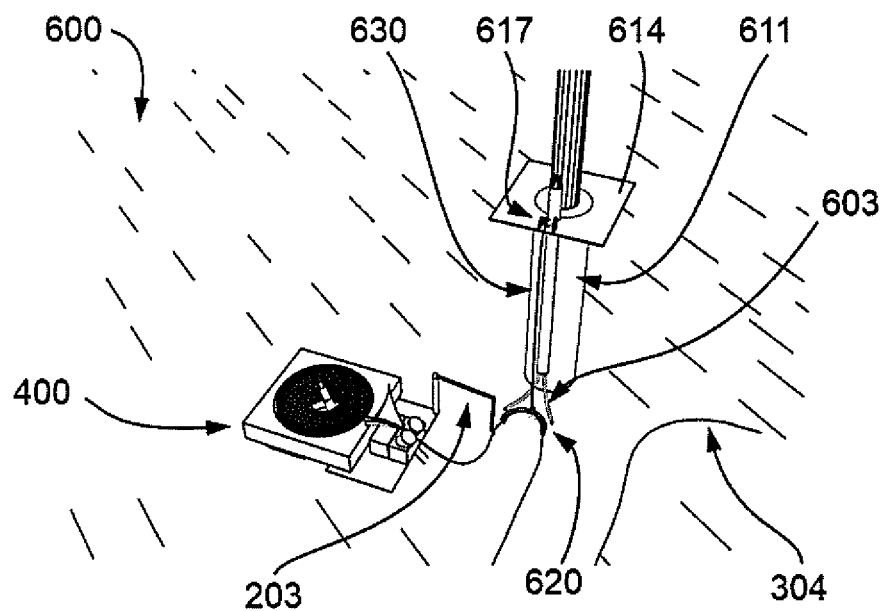

FIG. 6B shows the operation of the assembly 400 when it arrives to another facility 611 (e.g. wind turbine) where the installation of the cable 304 must be completed. The means 203 unrolls the cable 304 in excess so that the cable may be manipulated in the facility 611 and introduced in, for example, J-tubes 603.

A carrying means, which may be a hollow device 620 and have semi-circular shape, may be used to hoist the cable up from the seabed 600 and towards the platform 614 of the facility 611. The hollow device 620 may have the appropriate radius to ensure the cable is hoisted up without risk of bending more than its allowable bending radius. With this carrying means, the cable needs not be cut until an entire array cable (connecting several turbines) has been completely laid out. This allows transmitting data and power through said cable to the assembly 400 throughout the operation. The cable may be cut (for example for splicing and connecting to the turbine's electrical equipment) anytime after the complete installation of an array cable. Moreover, this operation may be conducted entirely above water.

Figure 6C:
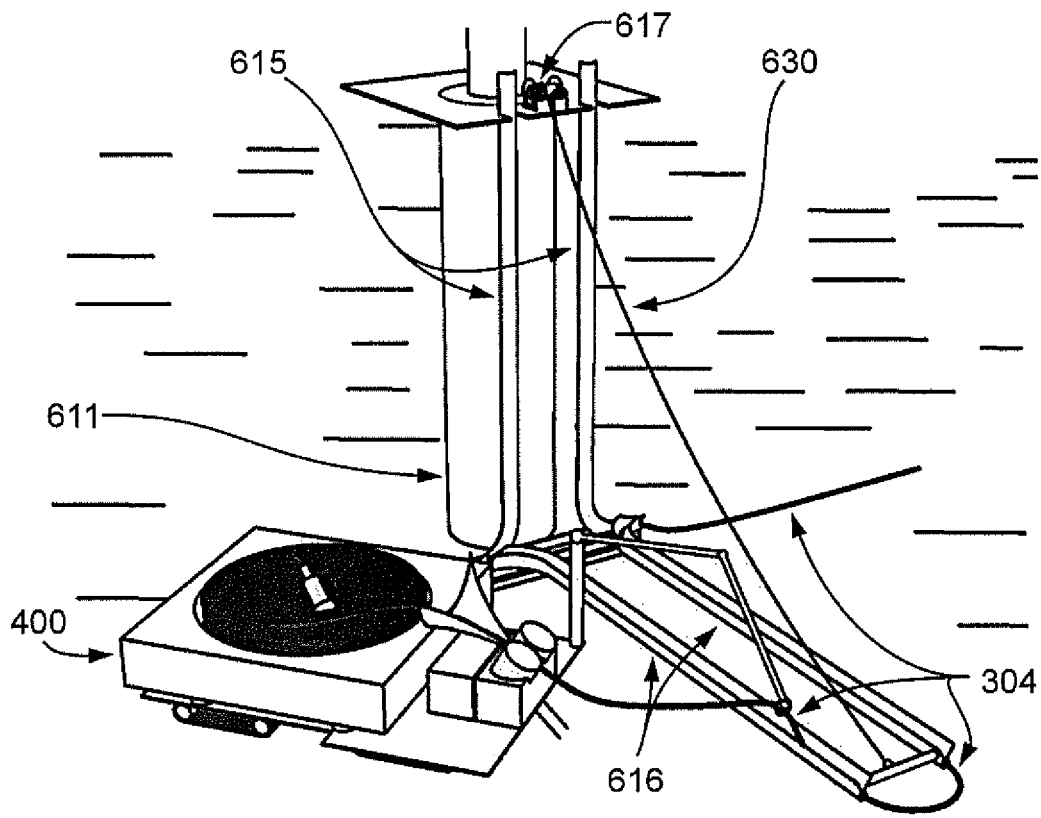

FIG. 6C shows another embodiment of the invention where the method to install the cable comprises the use of different carrying means to hoist the cable up towards the platform of the facility 611. In this embodiment, said carrying means comprises at least one unassembled tube or elongated element, and preferably two such tubes or elongated elements 615, 616. Each element can be split open lengthwise and one part of the tubes or elongated elements 616 can be laid on the seafloor with its open side upwards. A rope, chain or the like 630 may attach said part of the tubes 616 to a winch 617 on the platform of the facility 611, this way said part on the seafloor may be lifted to a vertical position so that it may be reassembled (i.e. joined together) with the other part 615 of the tubes or elongated elements.

The assembly 400 is operated to pass near the elongated element on the seafloor, and the means 203 for manipulating the cable 304 insert said cable in the parts 616 of the tubes or elongated elements 616 on the seafloor through their opening.

Figure 6D:
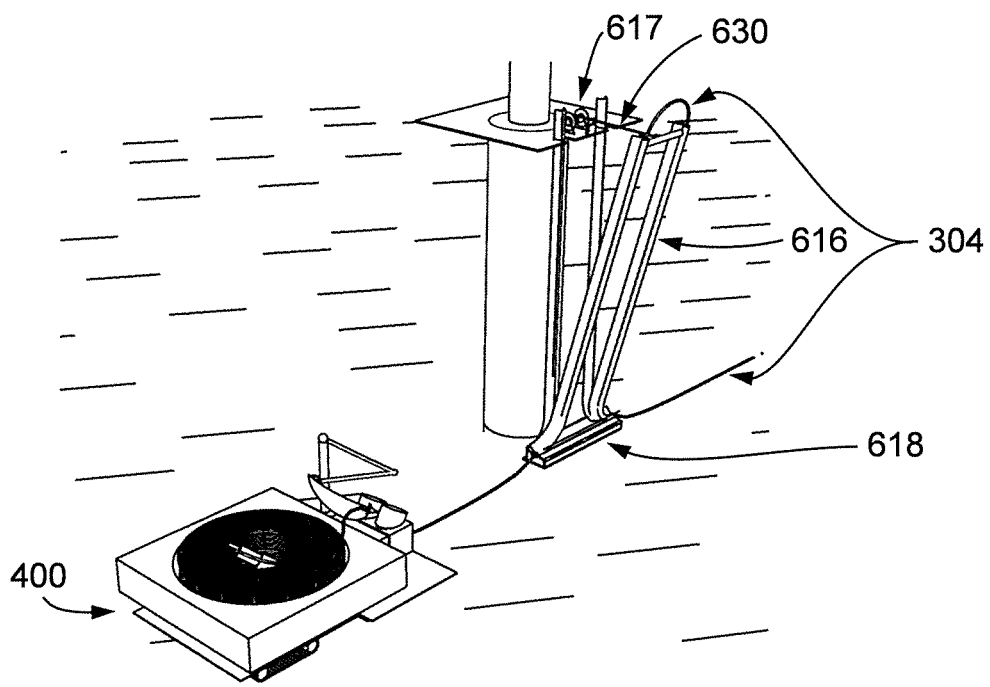

FIG. 6D illustrates how, in some embodiments of the invention, the part 616 of the tube or elongated element 616 that was laid on the seafloor may be hoisted back to an upright position by the winch 617 on the facility 611 pulling on the rope, chain or the like 630. The tubes 615, 616 or elongated elements may be articulated 618, for example at their lower end, in order to facilitate the assembly and disassembly of the two parts of said tubes or elongated elements 615, 616.

With this carrying means also, the cable needs not be cut until the installation of an entire array cable, connecting several turbines, is completed. This allows transmitting data and power through said cable to the assembly 400 throughout the entire operation. The cable may be cut (for example for splicing and connecting to the turbine electrical equipment) anytime after the installation of an array cable is completed, and this operation may be conducted entirely above water.

When the facility 611 is the last wind turbine of a branch in a wind farm, the submersible apparatus may unload the cable holder and make its way back to the substation using the at least one battery, while being controlled through a hydrophone or an antenna, for example.

Figure 7:
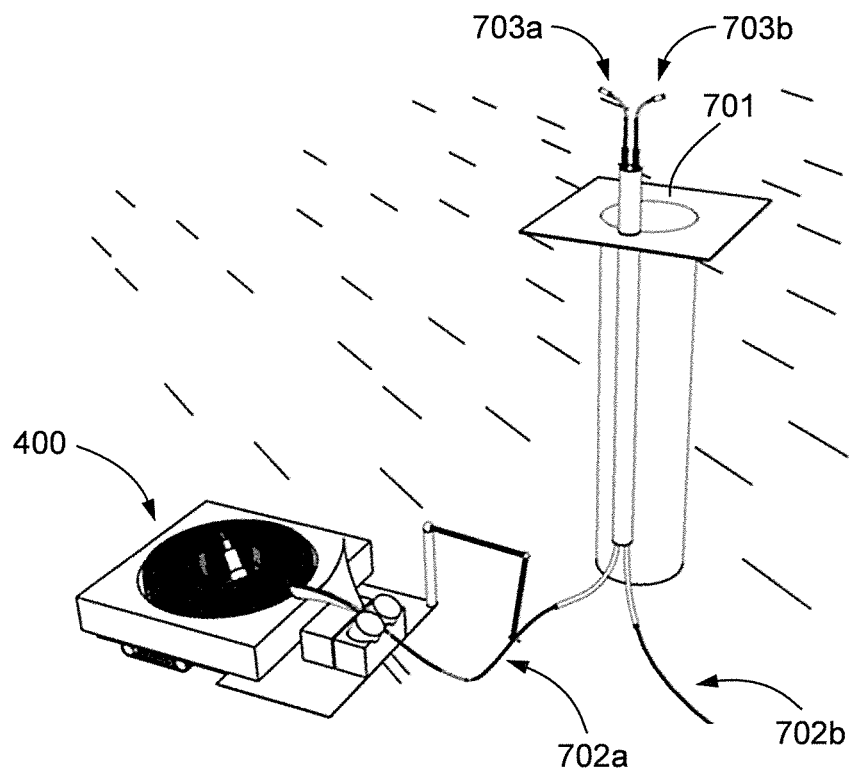
FIG. 7 is a representation of the installation of a submarine export cable in accordance with an embodiment of the invention.

FIG. 7 illustrates how to connect a first cable 702a that is being laid out to another cable 702b in accordance with an embodiment of the invention. The connection of the cables may form an export cable for transporting electric power from an offshore wave farm or wind farm, for instance, to an electrical grid on land.

After laying the cable 702a on the seafloor or in a trench, an end of the cable is raised to the platform 701 (e.g. using messenger wires). A submersible cable holder 300 comprising the cable 702b (to which the cable 702a will be connected) is positioned close to the platform 701 so that connection of cables 702a, 702b is simplified. Once an end of each cable is arranged on the platform 701, an operator may proceed to connect the cables using the plugs and connectors 703a and 703b provided in the cables in some embodiments, or splicing the cables together, for instance.

In other embodiments, a vessel is used instead of the platform 701, for example.

In yet other embodiments, the connection is executed without operators on-site. In this case underwater connectors may be used, and the assembly 400 is controlled remotely.

In this text, the term "comprises" and its derivations (such as "comprising", etc.) should not be understood in an excluding sense, that is, these terms should not be interpreted as excluding the possibility that what is described and defined may include further elements, steps, etc. The terms "seabed" and "seafloor" have been used indistinctly to refer to the floor of the sea or the ocean.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. An assembly (400) for installing a subsea cable (304), the assembly (400) comprising:
    a submersible apparatus (200) comprising a deck (201), at least one connector (202), and moving means (208); and
    a submersible cable holder (300) comprising the subsea cable (304), the subsea cable (304) being connectable to the submersible apparatus (200) through the at least one connector (202) for transmission of at least one of electric power and data to the submersible apparatus (200), and the submersible cable holder (300) being configured to be loaded on and unloaded from the deck (201);
    wherein the assembly (400) is configured to install the subsea cable (304) while the submersible apparatus (200) is electrically powered through the subsea cable (304).

2. The assembly (400) of claim 1, wherein a first end of the subsea cable (304) is connected to a power source of a facility (101,102) so that the at least one of electric power and data may be delivered to the submersible apparatus (200) upon connection of a second end of the subsea cable (304) to a connector of the at least one connector (202) of the submersible apparatus (200).

3. The assembly (400) of claim 1, wherein the submersible apparatus (200) is configured to transmit and receive data through the subsea cable (304).

4. The assembly (400) of claim 1, wherein the submersible apparatus (200) further comprises means (206) for digging a trench.

5. The assembly (400) of claim 1, wherein the submersible apparatus (200) further comprises at least one battery, the submersible apparatus (200) being configured to obtain electric power from the at least one battery.

6. The assembly (400) of claim 1, wherein the submersible apparatus (200) further comprises means for wireless data transmission and reception, the submersible apparatus (200) at least one of:
    being configured to transmit and receive data through said means, and
    the at least one connector comprises: a first connector (202) for connection of the subsea cable (304) and a second connector (215) for connection of a cable for data and power transmission to a device not part of the assembly.

7. The assembly (400) of claim 1, wherein the submersible apparatus (200) further comprises means (203) for manipulating at least one of: the cable (304), a cable connector, a cable accessory, or an obstacle on a seabed.

8. The assembly (400) of claim 1, wherein at least one of the submersible apparatus (200) and the submersible cable holder (300) comprises means for changing a buoyancy of the submersible apparatus (200) or the submersible cable holder (300), respectively.

9. The assembly (400) of claim 1, wherein the submersible apparatus (200) further comprises an acoustic positioning system for sensing subsea acoustic beacons.

10. A method for installing a subsea cable (304) with a submersible apparatus (200), the method comprising:

at least one of supplying electric power and transmitting data through the subsea cable (304) to the submersible apparatus (200);

digging a trench (604) in a seabed (600) with the submersible apparatus (200) and laying the subsea cable (304) in the trench with the submersible apparatus (200).

11. The method of claim 10, wherein a first end of the subsea cable (304) is connected to a power source of a facility (101,102) and a second end is connected to the submersible apparatus (200).

12. The method of claim 10, further comprising loading a submersible cable holder (300) on the submersible apparatus (200), the submersible cable holder comprising the subsea cable (304).

13. The method of claim 10, further comprising at least one of transmitting data to and receiving data from the submersible apparatus (200) through the subsea cable (304).

14. The method of claim 10, further comprising introducing part of the subsea cable (304) in a carrying means, the carrying means comprising two unassembled tubes (615, 616) being configured to be hoisted from a facility (601, 611).

15. The method of claim 14, wherein the two unassembled tubes (615,616) are configured to receive the subsea cable (304) while the first part is contacting the seafloor (600) such that the subsea cable (304) forms a U shape between the two unassembled tubes (615,616).

16. The method of claim 15, wherein the facility (601, 611) comprises a lifting mechanism (617) and an elongated flexible element (630) connected to the lifting mechanism (617), and wherein the carrying means is configured to be secured to the elongated flexible element (630).

17. The method of claim 10, further comprising introducing part of the subsea cable (304) in a carrying means, the carrying means comprising a hollow device (620) with a semi-circular shape and configured to be hoisted from a facility (601,611).

* * * * *